(12) United States Patent
Lee et al.

(10) Patent No.: US 11,435,753 B2
(45) Date of Patent: Sep. 6, 2022

(54) ROBOT HAVING CLEANING FUNCTION FOR SECURING CAMERA VISION AND METHOD OF CONTROLLING THE SAME

(71) Applicant: LG ELECTRONICS INC., Seoul (KR)

(72) Inventors: Jun Lee, Seoul (KR); Nakyeong Kim, Seoul (KR); Sungmin Moon, Seoul (KR); Sanghak Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 240 days.

(21) Appl. No.: 16/570,149

(22) Filed: Sep. 13, 2019

(65) Prior Publication Data

US 2020/0004264 A1    Jan. 2, 2020

(30) Foreign Application Priority Data

Aug. 14, 2019   (KR) .................. 10-2019-0099635

(51) Int. Cl.
    *G05D 1/02*      (2020.01)
    *A47L 9/28*      (2006.01)
    *B25J 11/00*     (2006.01)
    *B25J 19/00*     (2006.01)

(52) U.S. Cl.
    CPC .......... *G05D 1/0246* (2013.01); *A47L 9/2842* (2013.01); *B25J 11/0085* (2013.01); *B25J 19/0075* (2013.01); *G05D 2201/0215* (2013.01)

(58) Field of Classification Search
    CPC .......... G05D 1/0246; G05D 2201/0215; A47L 9/2842; A47L 9/2826; A47L 9/2852; A47L 9/2857; A47L 9/2894; A47L 11/4011; A47L 11/4061; A47L 2201/04; B25J 11/0085; B25J 19/0075; B25J 19/023; B25J 19/0058; B25J 9/126; B25J 9/1674; B25J 9/1679
    See application file for complete search history.

(56) References Cited

U.S. PATENT DOCUMENTS 8,347,445 B2 * 1/2013 Park ................. A46B 13/001
                                                    15/104.31

FOREIGN PATENT DOCUMENTS

| CN | 204425491 U | * | 6/2015 |
| CN | 206805772 U |   | 12/2017 |
| JP | 2002-169219 A |   | 6/2002 |
| JP | 2002169219 A | * | 6/2002 |

(Continued)

*Primary Examiner* — Khoi H Tran
*Assistant Examiner* — Nhi Q Bui
(74) *Attorney, Agent, or Firm* — Birch, Stewart, Kolasch & Birch, LLP (57) ABSTRACT

A robot having a camera cleaning function and a method of controlling the same are provided. The robot has a cleaning function for securing a camera field of view. The robot includes a camera that has a foreign material detection sensor, a rotation cover formed of a transparent material to protect the camera from the foreign material and at a position spaced apart from the camera in all directions, and a housing fixed to a photographing position of the robot. The camera outputs a detection signal upon detecting a foreign material, and takes an image in all directions. The rotation cover rotates according to the detection signal. The housing fixes a driving module of the rotation cover, and is connected to a cleaning module for cleaning the rotation cover.

20 Claims, 8 Drawing Sheets

(56) References Cited

FOREIGN PATENT DOCUMENTS

| KR | 20070045475 A | * | 5/2007 | ........... G05D 1/0246 |
|----|---------------|---|--------|-------------------------|
| KR | 1255522 B1 | * | 4/2013 | |
| KR | 10-1954059 B1 | | 6/2019 | |
| KR | 101954059 B1 | * | 6/2019 | |

* cited by examiner

ROBOT HAVING CLEANING FUNCTION FOR SECURING CAMERA VISION AND METHOD OF CONTROLLING THE SAME

CROSS-REFERENCE TO RELATED APPLICATIONS

The present application claims priority under 35 U.S.C. 119 and 35 U.S.C. 365 to Korean Patent Application No. 10-2019-0099635 (filed on Aug. 14, 2019), which is hereby incorporated by reference in its entirety.

FIELD

The present disclosure relates to an apparatus having a camera cleaning function and a method of controlling the same, and particularly, to a robot capable of being smoothly driven by automatically detecting a foreign material and a method of controlling the same.

BACKGROUND

In general, a robot is a machine that automatically processes a given task or operates by its own ability. Robot applications are generally classified into various fields such as an industrial field, a medical field, a space field, a seabed field, and the like. Recently, communication robots capable of communicating or interacting with humans through voices or gestures have been increased.

Such a communication robot may include various types of robots, such as a guide robot disposed at a specific place to guide various information to a user, a home robot provided in a home, and the like.

Meanwhile, when manufacturing a large amount of food, or when making a dish according to a precise recipe, the situation that a robot substitutes for the role has be gradually increased. In particular, a robot that tracks the cooking state of food using a camera attached to a joint, an arm or a head of the robot and proceeds with cooking according to the progress has been developed and actually applied.

In this regard, the technology for monitoring the progress of food with a camera, or the like is disclosed, but there are no devices that are mounted on the arm or joint of a robot for cooking food to monitor the progress of cooking, or robots to remove any visual disturbances caused by food or foreign materials.

In addition, the camera of a cooking robot may cause a malfunction or stop the operation due to foreign materials such as water vapor, oil vapor or adsorption materials.

SUMMARY

Embodiments provide a robot having a camera cleaning function of removing a foreign material to prevent malfunction by increasing a camera recognition rate, and a method of controlling the same.

In one embodiment, a robot having a cleaning function for securing a camera field of view includes: a camera having a foreign material detection sensor and configured to output a detection signal upon detecting a foreign material and take an image in all directions; a rotation cover formed of a transparent material to protect the camera from the foreign material and at a position spaced apart from the camera in all directions, and configured to rotate according to the detection signal; and a housing fixed to a photographing position of the robot, configured to fix a driving module of the rotation cover, and connected to a cleaning module which is configured to clean the rotation cover.

The driving module may include a motor positioned between the rotation cover and the housing or at an outside of the housing to rotate the camera or to simultaneously rotate the camera and the rotation cover.

The camera may be fixed to the housing, a rotary shaft of the rotation cover may be connected to the motor, and the motor may rotate the rotation cover according to the detection signal.

The rotation cover may be rotated by 360 degrees by the motor.

The camera may be fixed to the rotation cover, a rotary shaft of the rotation cover may be connected to the motor, and the motor may rotate the rotation cover according to the detection signal to simultaneously rotate the camera and the rotation cover.

The camera and the rotation cover may be rotated by −180 degrees to +180 degrees about the rotary shaft by the motor.

The housing may include a nozzle configured to inject at least one of air, water, or a cleaning liquid into an inside of the housing according to the detection signal; and an elastic member configured to form a space between the rotation cover and the housing to position the nozzle, and formed at two ends of the rotation cover to prevent leakage of a spraying material of the nozzle and in close contact with the rotation cover.

The cleaning module may include a cleaning tube configured to supply at least one of air, water, or a cleaning liquid into the housing; and a suction tube configured to remove the foreign material during or after cleaning the rotation cover.

The cleaning module and the suction tube may be driven when a sum of pixel values of an image collected by the camera is less than a preset threshold, and an operation of the rotation cover may be stopped when the suction tube is driven.

The robot may further include a controller configured to drive at least one of the rotation cover, the driving module, or the cleaning module according to the detection signal transmitted from the camera.

In another embodiment, a method of controlling a robot having a cleaning function for securing a camera field of view includes: outputting a detection signal when a foreign material is detected on a rotation cover, wherein the rotation cover is formed of a transparent material to protect a camera and at a position spaced apart from the camera in all directions; and rotating the rotation cover by a driving module provided in a housing while injecting at least one of air, water, or a cleaning liquid to the rotation cover through a nozzle provided in the housing in a cleaning module according to the detection signal.

The method may further include drying the rotation cover after cleaning the rotation cover.

The outputting of the detection signal may include stopping an operation of the robot other than cleaning before the rotation cover is rotated after the detection signal is output.

The rotating of the rotation cover may include supplying at least one of the air, the water, or the cleaning liquid from a cleaning tube of the cleaning module to the nozzle provided in the housing to inject the at least one of the air, the water, or the cleaning liquid to an inside of the rotation cover; and sucking the foreign material through a suction tube provided in the cleaning module, and the suction tube may be driven when a sum of pixel values of an image collected by the camera is less than a preset threshold.

The rotating of the rotation cover may further include stopping an operation of the rotation cover when the suction tube is driven.

The rotating of the rotation cover may include rotating the rotation cover by a motor provided in the driving module, in which the camera positioned inside the rotation cover is fixed to the housing positioned outside the rotation cover.

The rotation cover may be rotated by 360 degrees by the motor.

The rotating of the rotation cover may include rotating the camera and the rotation cover by rotating a rotary shaft of the rotation cover by a motor provided in the driving module, in which the camera and the rotary shaft are fixed to the housing.

The cleaning module may be driven when a sum of pixel values of an image collected by the camera is less than a preset threshold.

The method may further include driving at least one of the rotation cover, the driving module, or the cleaning module by receiving the detection signal transmitted from the camera at a controller.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In addition, the terms "first" and "second" can be selectively or exchangeably used for the members. In the figures, a dimension of each of elements may be exaggerated for clarity of illustration, and the dimension of each of the elements may be different from an actual dimension of each of the elements. Not all elements illustrated in the drawings must be included and limited to the present disclosure, but the elements except essential features of the present disclosure may be added or deleted. Also, in the descriptions of embodiments, it will be understood that when a layer (or film), a region, a pattern, or a structure is referred to as being 'on/above/over/upper' substrate, each layer (or film), a region, a pad, or patterns, it can be directly on substrate each layer (or film), the region, the pad, or the patterns, or intervening layers may also be present. Further, it will be understood that when a layer is referred to as being 'under/below/lower' each layer (film), the region, the pattern, or the structure, it can be directly under another layer (film), another region, another pad, or another patterns, or one or more intervening layers may also be present. Therefore, meaning thereof should be judged according to the spirit of the present disclosure.

A robot may mean a machine that automatically processes or operates a given task by its own ability. In particular, a robot having functions of recognizing an environment, judging itself, and performing an operation may be referred to as an intelligent robot.

Robots may be classified into industrial, medical, household, military, and the like according to the purpose or field of use.

The robot may include a driving unit including an actuator or a motor to perform various physical operations of moving a robot joint and the like. In addition, a movable robot may include a wheel, a brake, a propeller, and the like and travel on the ground or fly in the air through a driving unit.

Artificial intelligence refers to the field of researching artificial intelligence or a methodology capable of making it. Machine learning refers to the field of defining various problems treated in the field of artificial intelligence and studying methodologies to solve them. Machine learning is also defined as an algorithm that improves the performance of a task through a consistent experience with a task.

An artificial neural network (ANN), which is a model used in machine learning, may refer to a general model having a problem solving ability, which consists of artificial neurons (nodes) forming a network by a combination of synapses. The artificial neural network may be defined by a connection pattern between neurons of different layers, a learning process of updating model parameters, and an activation function for generating an output value.

The artificial neural network may include an input layer, an output layer, and optionally one or more hidden layers. Each layer may include one or more neurons, and the artificial neural network may include synapses that connect neurons to neurons. In an artificial neural network, each neuron may output a function value of an active function for input signals, weights, and deflections input through synapses.

The model parameter means a parameter determined through learning, and includes a weight of synaptic connection and the deflection of neurons. In addition, the hyperparameter means a parameter to be set before learning in a machine learning algorithm, and includes a learning rate, the number of iterations, a mini batch size, an initialization function, and the like.

The purpose of learning of an artificial neural network may be understood as determining model parameters that minimize a loss function. The loss function may be used as an index for determining optimal model parameters in the learning process of the artificial neural network.

Machine learning may be classified into supervised learning, unsupervised learning, and reinforcement learning according to a learning scheme.

The supervised learning means a scheme of learning an artificial neural network in a state in which a label for learning data is given, and a label means a correct answer (or result value) that the artificial neural network must deduce when the learning data are input to the artificial neural network. The unsupervised learning may refer to a scheme of learning an artificial neural network in a state where a label for learning data is not given. The reinforcement learning may mean a learning scheme that allows an agent defined in an environment to learn to choose an action or sequence of actions that maximizes cumulative reward in each state.

Machine learning implemented with a deep neural network (DNN) including a plurality of hidden layers among artificial neural networks is also referred to as deep learning. The deep learning is a part of machine learning. Hereinafter, the machine learning is used as including deep learning.

Figure 1:
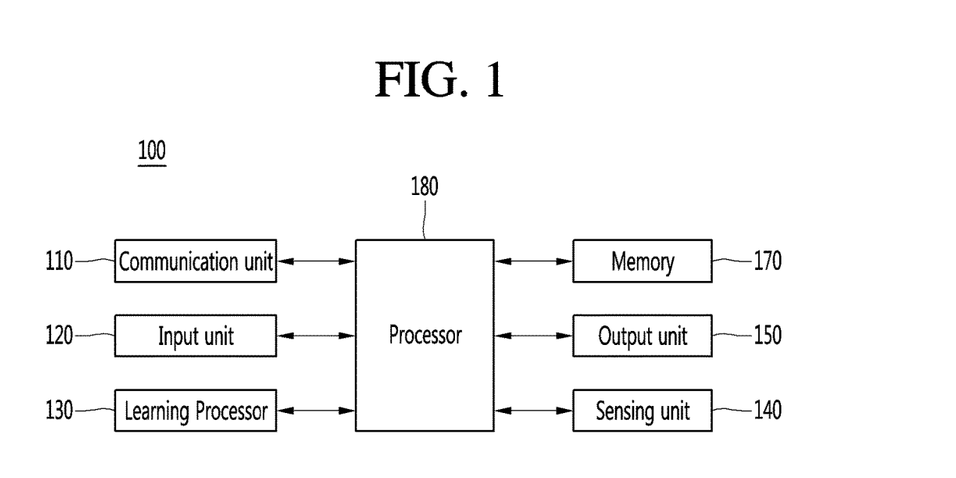
FIG. 1 illustrates an AI device including a robot according to an embodiment.

FIG. 1 illustrates an AI device 100 according to an embodiment.

An AI device 100 may be implemented as fixed device or a movable device such as a TV, projector, mobile phone, smartphone, desktop computer, notebook, digital broadcasting terminal, PDA (personal digital assistants), PMP (portable multimedia player), navigation, tablet PC, wearable device, set top It may be implemented as a stationary device or a movable device, such as a box STB, a DMB receiver, a radio, a washing machine, a refrigerator, a desktop computer, a digital signage, a robot, a vehicle, or the like.

Referring to FIG. 1, the terminal 100 includes a communication unit 110, an input unit 120, a learning processor 130, a sensing unit 140, an output unit 150, a memory 170, and a processor 180.

The communication unit 110 may transmit and receive data with external devices such as other AI devices 100a to 100e or AI server 200 using wired or wireless communication technology. For example, the communicator 110 may transmit/receive sensor information, a user input, a learning model, a control signal, and the like with external devices.

In this case, the communication technology used by the communication unit 110 in the Global System for Mobile communication (GSM), Code Division Multi Access (CDMA), Long Term Evolution (LTE), 5G, WLAN (Wireless LAN), Wi-Fi (Wireless-Fidelity, Bluetooth™, Radio Frequency Identification (RFID), Infrared Data Association (IrDA), ZigBee, Near Field Communication (NFC), and the like.

The input unit 120 may acquire various kinds of data.

In this case, the input unit 120 may include a camera for inputting an image signal, a microphone for receiving an audio signal, a user input unit for receiving information from a user, and the like. In this case, the signal obtained from the camera or microphone may be referred to as sensing data or sensor information by treating the camera or microphone as a sensor.

The input unit 120 may acquire input data to be used when acquiring an output using the training data and the training model for model learning. The input unit 120 may obtain raw input data. In this case, the processor 180 or the learning processor 130 may extract an input feature from the input data as preprocessing.

The learning processor 130 may train a model composed of artificial neural networks using the training data. Here, the learned artificial neural network may be referred to as a learning model. The learning model may be used to infer result values for new input data other than the training data, and the inferred values may be used as a basis for judgment to perform an operation.

In this case, the learning processor 130 may perform AI processing together with the learning processor 240 of the AI server 200.

In this case, the learning processor 130 may include a memory integrated or implemented in the AI device 100. Alternatively, the learning processor 130 may be implemented using a memory 170, an external memory directly coupled to the AI device 100, or a memory held in the external device.

The sensing unit 140 may obtain at least one of the internal information of the AI device 100, the surrounding environment information of the AI device 100, and the user information by using various sensors.

In this case, the sensor included in the sensing unit 140, proximity sensor, illumination sensor, acceleration sensor, magnetic sensor, gyro sensor, inertial sensor, RGB sensor, IR sensor, fingerprint recognition sensor, ultrasonic sensor, light sensor, microphone, Riders and radars.

The output unit 150 may generate an output related to visual, auditory or tactile.

In this case, the output unit 150 may include a display unit for outputting visual information, a speaker for outputting auditory information, a haptic module for outputting tactile information.

The memory 170 may store data supporting various functions of the AI device 100. For example, the memory 170 may store input data, training data, training model, training history, and the like acquired by the input unit 120.

The processor 180 may determine at least one executable operation of the AI device 100 based on the information determined or generated using the data analysis algorithm or the machine learning algorithm. In addition, the processor 180 may control the components of the AI device 100 to perform the determined operation.

To this end, the processor 180 may request, retrieve, receive, or utilize data from the learning processor 130 or the memory 170, and determine that the at least one executable operation is expected or desirable. The components of the AI device 100 may be controlled to execute an operation.

In this case, the processor 180 may generate a control signal for controlling the external device in order to perform the determined operation, and transmit the generated control signal to the corresponding external device.

The processor 180 may obtain intention information about the user input, and determine the requirement of the user based on the obtained intention information.

In this case, the processor 180 uses at least one of a Speech To Text (STT) engine for converting a voice input into a string or a Natural Language Processing (NLP) engine for obtaining intent information of a natural language. Thus, intention information corresponding to the user input may be obtained.

In this case, at least one or more of the STT engine or the NLP engine may be composed of an artificial neural network, at least partly learned according to a machine learning algorithm. At least one of the STT engine or the NLP engine may be learned by the learning processor 130, may be learned by the learning processor 240 of the AI server 200, or may be learned by distributed processing thereof.

The processor 180 collects history information including the user's feedback about the operation content or the operation of the AI device 100 and stores it in the memory 170 or the learning processor 130 or the AI server 200. Can be sent to an external device. The collected historical information can be used to update the learning model.

The processor 180 may control at least some of the components of the AI device 100 to drive an application program stored in the memory 170. In addition, the processor 180 may operate two or more of the components included in the AI device 100 in combination with each other to drive the application program.

Figure 2:
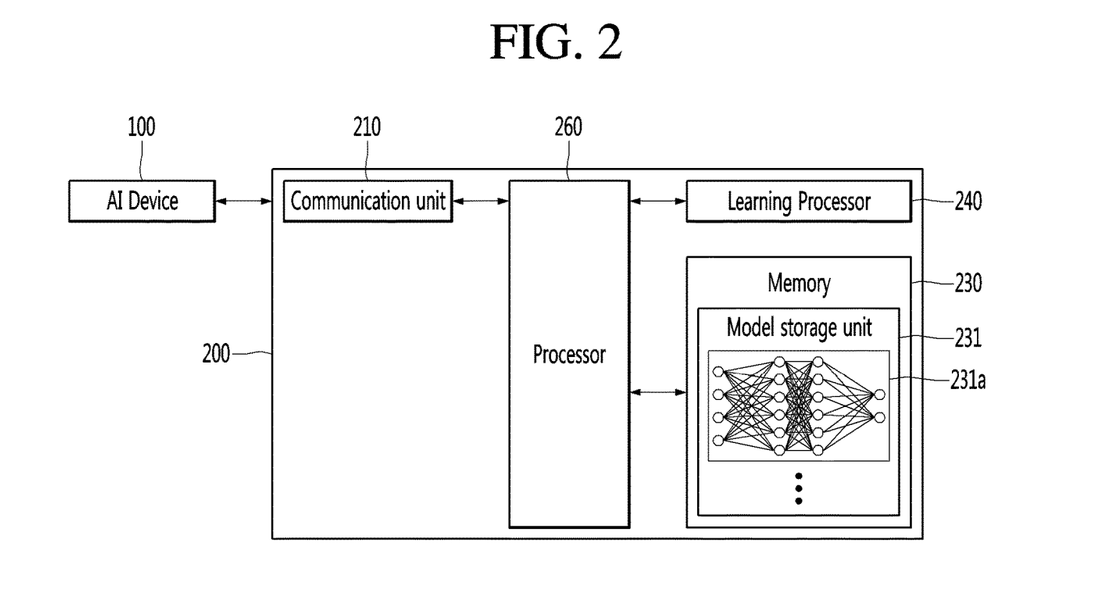
FIG. 2 illustrates an AI server connected to a robot according to an embodiment.

FIG. 2 illustrates an AI server 200 according to an embodiment.

Referring to FIG. 2, the AI server 200 may refer to an apparatus that learns an artificial neural network by using a machine learning algorithm or uses the learned artificial neural network. In this case, the AI server 200 may be composed of a plurality of servers to perform distribution processing, or may be defined as a 5G network. In this case, the AI server 200 may be included as a part of the AI device 100 may perform at least some of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may allow the artificial neural network 231 to learn by using the learning data. The learning model may be used while mounted on the AI server 200 of the artificial neural network, or may be used while mounted on an external device such as the AI device 100.

The learning model may be implemented in hardware, software or a combination of hardware and software. When some or all of the learning model is implemented in software, one or more instructions constituting the learning model may be stored in the memory 230.

The processor 260 may infer a result value with respect to the new input data by using the learning model, and generate a response or control command based on the inferred result value.

Figure 3:
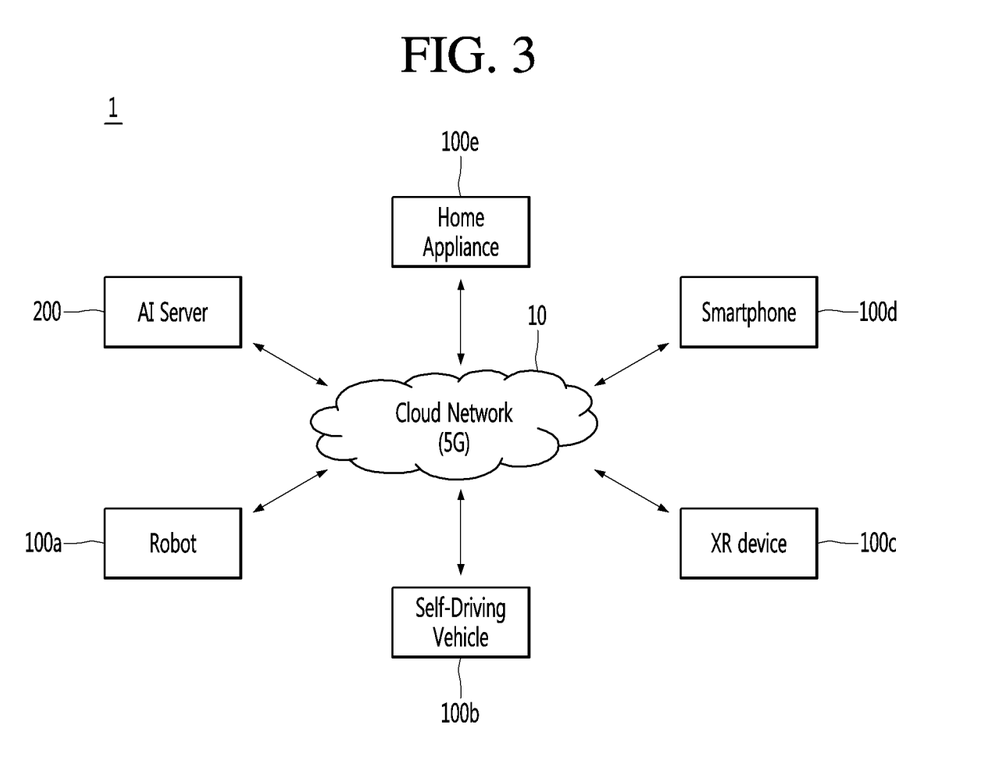
FIG. 3 illustrates an AI system including a robot according to an embodiment.

FIG. 3 illustrates an AI system 1 according to an embodiment.

Referring to FIG. 3, in the AI system 1, at least one of an AI server 200, a robot 100a, an autonomous vehicle 100b, an XR device 100c, a smartphone 100d, or a home appliance 100e is connected to a cloud network 10. In this case, the robot 100a to which the AI technology is applied, the autonomous vehicle 100b, the XR device 100c, the smartphone 100d, or the home appliance 100e may be referred to as an AI device 100a to 100e.

The cloud network 10 may refer to a network that forms a part of the cloud computing infrastructure or exists within the cloud computing infrastructure. In this case, the cloud network 10 may be configured by using a 3G network, a 4G or long term evolution (LTE) network or a 5G network.

That is, the devices 100a to 100e and 200 constituting the AI system 1 may be connected to each other through the cloud network 10. In particular, although the devices 100a to 100e and 200 may communicate with each other through a base station, the devices may also communicate with each other directly without passing through the base station.

The AI server 200 may include a server that performs AI processing and a server that performs operations on big data.

The AI server 200 may be connected to at least one among the robot 100a, the autonomous vehicle 100b, the XR device (100c), the smart phone 100d or the home appliances 100e, which are the AI devices constituting the AI system 1, through the cloud network 10, and may aid at least some of the AI processing of the connected AI devices 100a to 100e.

In this case, the AI server 200 may allow the artificial neural network to learn according to the machine learning algorithm on behalf of the AI devices 100a to 100e, may directly store the learning model or transmit to the AI devices 100a to 100e.

In this case, the AI server 200 may receive the input data from the AI devices 100a to 100e, infer the result value with respect to the input data received by using the learning model, may generate the response based on the inferred result value or control command, and transmit to the AI devices 100a to 100e.

Alternatively, the AI devices 100a to 100e may infer the result value with respect to the input data by using a direct learning model, and generate the response or control command based on the inferred result value.

Hereinafter, various examples of the AI devices 100a to 100e to which the above-described technology is applied will be described. In this case, the AI devices 100a to 100e illustrated in FIG. 3 may be understood as specific examples of the AI device 100 illustrated in FIG. 1.

The robot (100a) to which the AI technology is applied may be implemented as a guide robot, a transport robot, a cleaning robot, a wearable robot, an entertainment robot, a pet robot, an unmanned flying robot.

The robot 100a may include a robot control module for controlling an operation, and the robot control module may mean a software module or a chip implemented in hardware.

The robot 100a may obtain state information of the robot 100a by using sensor information obtained from various kinds of sensors, detect (recognize) a surrounding environment and an object, generate map data, determine a moving route and a traveling plan, determine a response to a user interaction, or determine an operation.

In this case, the robot 100a may use sensor information obtained from at least one sensor among a lidar, a radar, and a camera to determine the moving route and the traveling plan.

The robot 100a may perform the above-described operations by using a learning model composed of at least one artificial neural network. For example, the robot 100a may recognize a surrounding environment and an object by using the learning model, and determine an operation by using information about the recognized surrounding environment or object. In this case, the learning model may be directly learned by the robot 100a or may be learned by an external device such as the AI server 200.

In this case, the robot 100a may perform an operation by generating a result using a direct learning model. In addition, the robot 100a may transmit sensor information to an external device such as the AI server 200 and receive a result generated accordingly.

The robot 100a may determine a moving route and a traveling plan by using at least one or more of map data, object information detected from sensor information, or object information obtained from an external device, and may move according to the moving route and the traveling plan determined by controlling a driving unit.

The map data may include object identification information of various objects arranged in the space in which the robot 100a moves. For example, the map data may include object identification information about fixed objects such as walls, doors, and the like, and movable objects such as flower pots, desks, and the like. In addition, the object identification information may include a name, a kind, a distance, a location, and the like.

In addition, the robot 100a may perform an operation or travel by controlling the driving unit based on the control/interaction of a user. In this case, the robot 100a may obtain the intention information of the interaction according to the user's motion or speech, and determine a response based on the obtained intention information to perform the operation.

Figure 4:
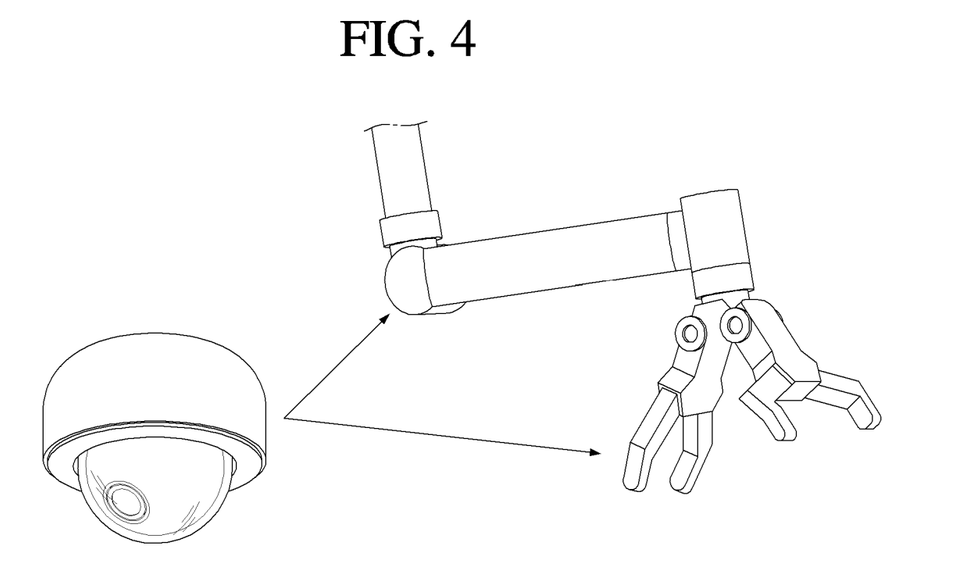
FIG. 4 illustrates a state in which a camera is mounted on a robot to monitor a cooking state according to an embodiment.

FIG. 4 illustrates a state in which the camera 20 is mounted on the robot 100a to monitor the cooking state according to an embodiment.

Referring to FIG. 4, the camera 20 may be mounted on an joint or an arm of the cooking robot 100a, that is, an end effector cooking directly, but the embodiment is not limited thereto. The camera 20 may be installed in an optimal position to monitor the cooking progress, such as a head of the robot 100a or a ceiling.

In addition, when the camera 20 is directly installed on the robot 100a, a vision camera 20 may be separately installed on the ceiling. An example of installing the vision camera 20 to the joint of the robot 100a to monitor a food cooling state will be described with reference to the following drawings including FIG. 5.

Figure 5:
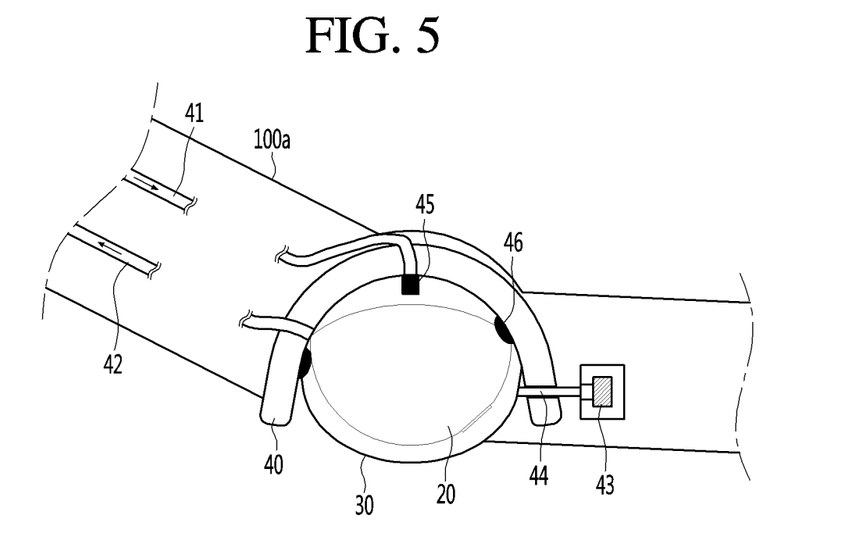
FIG. 5 illustrates a state in which a camera is mounted on the joint of a robot to monitor a cooking state according to an embodiment.

FIG. 5 illustrates a state in which the camera 20 is mounted on the joint of the robot 100a to monitor the cooking state according to an embodiment.

Referring to FIG. 5, the robot 100a may include a camera 20, a rotation cover 30, a housing 40, and a controller. Since the contents related to the AI device of FIG. 1 may be similarly applied to the robot 100a of the embodiment, the contents overlapping with the above-described contents in FIG. 1 will be omitted.

For example, the robot 100a may be connected to a network through an access point such as a router. Thus, the robot 100a may provide various information obtained through the input unit 120 or the sensing unit 140 to a server or a mobile terminal through the network.

In the embodiment, the camera 20 may be understood as a form of the input unit 120 or the sensing unit 140. In addition, although not shown in the drawings, the robot 100a of the embodiment may include a controller. The controller may drive at least one of the rotation cover 30, the driving module or the cleaning module according to the sensing signal transmitted from the camera 20 or at least one of spraying schemes present according to the selection of a user.

The camera 20 may be provided with a foreign material detection sensor to output a sensing signal when a foreign material is detected and may take an image in all directions. The camera 20, which is configured to detect a foreign material, may include the foreign material detection sensor which is able to be configured separately according to the embodiment. The camera 20 may include an image camera 20 for detecting a foreign material at the same angle as the camera 20 in the housing 40.

The camera 20 may include a vision camera 20. In this case, the camera 20 may receive or monitor a cooking state, photograph a measured value according to a photographing signal by photographing, and confirm the cooking state through the image of the photographed measured value, or check the foreign substance.

When the controller receives an image from the camera 20, the controller may store the received image and recognize each measured value from the image by using a stored program. In addition, the controller may store the recognized measured value as a data file, and photograph at a preset photographing cycle.

The rotation cover 30 may be formed at a position spaced apart in the omnidirectional direction from the camera 20 from the foreign material of a transparent material to protect the camera 20 and may rotate corresponding to the sensing signal.

The rotation cover 30 may be rotated by the driving module, the driving module may be rotated in accordance with the command of the controller according to the sensing signal. The camera 20 is placed inside the rotation cover 30, and serves to protect the camera 20 from a foreign material. Therefore, the rotation cover serves to primarily filter a foreign material, and is always kept clean for securing the field of view of the camera 20 according to the embodiment.

The rotation cover 30 may be coupled to the inside of the housing 40, opened toward the camera 20, and provided with a nozzle 45 which is installed to an inside of the housing 40 which is not opened to perform the cleaning of the rotation cover 30.

The rotation cover 30 may be formed of a glass material for protecting the camera 20, and may include a foreign material detection sensor for sensing a foreign material attached to a protection film such as a glass or a wiper according to an amount of foreign material. When a certain amount of foreign material or more is attached to an outside, it is possible to automatically operate the wiper to remove the foreign material.

The housing 40 may be fixed at a photographing position of the robot 100a and may be connected to a cleaning module that fixes the driving module of the rotation cover 30 and cleans the rotation cover 30.

The cleaning module may include a cleaning tube 41 for supplying at least one of air, water, or a cleaning liquid into the housing 40, and a suction tube 42 for removing the foreign material during or after cleaning the rotation cover 42.

The cleaning tube 41 and the suction tube 42 may be mounted inside the arm of the robot 100a, and may be designed to be operated by the sensing signal of the controller. That is, the cleaning module and the driving module may operate at the same time according to the sensing signal to rotate the rotation cover 30 and to clean and suck the foreign material.

The cleaning module may start driving if the sum of pixel values of the image collected by the camera 20 is less than a preset threshold. It means that the image quality of the camera 20 is deteriorated due to the foreign materials present on the rotary cover 30.

Because the object cannot be recognized when the pixel value is low, therefore the cleaning module may be driven based on the pixel value of the image measured by the camera 20. In his case, the threshold may mean a pixel value which is able to monitor the cooking state, and may be set by the user.

The suction tube may start driving if the sum of pixel values of the image collected by the camera 20 is less than a preset threshold, in similar with the cleaning module. It means that the image quality of the camera 20 is deteriorated due to the foreign materials present on the rotary cover 30.

However, in this case, the robot has to remove the foreign materials on the rotary cover 30, the operation of the rotary cover 30 and the cleaning module is stopped, and the suction tube may be driven. The threshold may mean a pixel value which is able to monitor the cooking state, and may be set by the user in the same manner as the threshold of the cleaning module.

Inside the cleaning tube 41, a means for checking the remaining amount in the cleaning tube 41, which is connected to an inlet for supplying at least one of air, water or cleaning liquid, may be provided.

The cleaning tube 41 may be connected to the nozzle 45 inside the housing 40, is usually suppled to the nozzle 45 in a pulled state, and use the scheme of operating the nozzle 45 according to the sensing signal. All means operating according to the signal may be applied to the injection scheme.

The driving module may further include a motor 43 for rotating the camera 20 or the camera 20 and the rotation cover 30 at the same time, which is placed between the rotation cover 30 and the housing 40 or at the outside of the housing 40.

The driving module may be provided with the motor 43, and may include the shape of a general actuator. The motor 43 may supply power to the rotation cover 30. The motor 43, which is the driving source, may be connected to a rotary shaft 44 to rotate the rotary shaft 44, and may include a general stepping motor or all motors capable of providing rotation.

The housing 40 may further include the nozzle 45 for injecting at least one of air, water, or a cleaning liquid into an inside of the housing 40 by at least one of a preset spraying scheme according to the sensing signal or a selection of a user, and an elastic member 46 for forming a space between the rotation cover 30 and the housing 40 to position the nozzle 45, and formed at two ends of the rotation cover 30 to prevent leakage of a spraying material of the nozzle 45 and in close contact with the rotation cover 30.

As described above, the nozzle 45 is connected to the cleaning tube 41 to fully receive and store at least one of air, water or cleaning liquid. The nozzle 45 may be on/off-controlled according to the sensing signal or at least one of injection schemes preset by the selection of the user to spray at least one of air, water or cleaning liquid to the glass surface of the rotation cover 30 located inside the housing 40, thereby removing foreign materials.

According to an embodiment, it is possible to drive the rotation cover 30 and the cleaning module according to the sensing signal or at least one of injection schemes preset according to the selection of a user.

The camera 20 may monitor in real time whether there is rainwater on the rotation cover while the power is supplied, whether there is dust such as yellow dust, or whether there is a foreign material such as food.

The camera 20 may perform monitoring by using an ultrasonic sensor, and may output the sensing signal when a foreign material is detected. However, the embodiment is not limited thereto, and the camera 20 may include all means capable of informing the rotation cover 30 and the cleaning module that foreign material has been detected.

When detecting the foreign material in the camera 20 equipped with the foreign material detection sensor, the sensing signal may be output to the controller to drive at least one of the rotation cover 30, the cleaning module, or the driving module.

According to an embodiment, before the rotation cover 30 is rotated after the sensing signal is output, the robot 100a may be programed to stop the operations of the robot 100a except for the cleaning, or to drive first and second motors 431 and 432 to be continuously operated.

According to another embodiment, the cleaning module may be driven by at least one of the injection schemes preset according to the selection of a user. The rotation cover and the cleaning module may be controlled by the sensing signal detected by the controller, and may be controlled in a preset injection scheme.

The injection scheme is programed to drive the cleaning module at a predetermined time or step in advance according to the state of the components included in the robot in addition to the sensing signal in the spray condition of the cleaning module.

For example, the injection scheme may drive the cleaning module without regard to sensing signal, where air, water or cleaning liquid is injected at intervals of 5 minutes, or by mixing them. Alternatively, the air may be first injected, and then the injection order or the type of injecting such as water spraying may be adjusted. The injection scheme may include all types of injection, such as injecting time, strength adjustment, injection angle of injected materials, and the like.

The reference time for controlling the cleaning module may be set by the above-described sensing signal or by a preset injection scheme associated with the cleaning module.

The elastic member 46 serves to prevent the foreign material washed to leak out of the rotation cover 30, and formed of a material that can clean the rotation cover 30 during rotation according to an embodiment.

The elastic member 46 may adjust an elastic modulus to provide a constant pressure because the elastic cover 46 may be in close contact with the housing 40 and the washing function of the rotation cover 30 may be performed. In this case, since the elastic modulus is inversely proportional to the rotation and the degree of adhesion to the housing 40 is proportional to the rotation, the elastic modulus may be designed by adjusting to an appropriate value.

Figure 6:
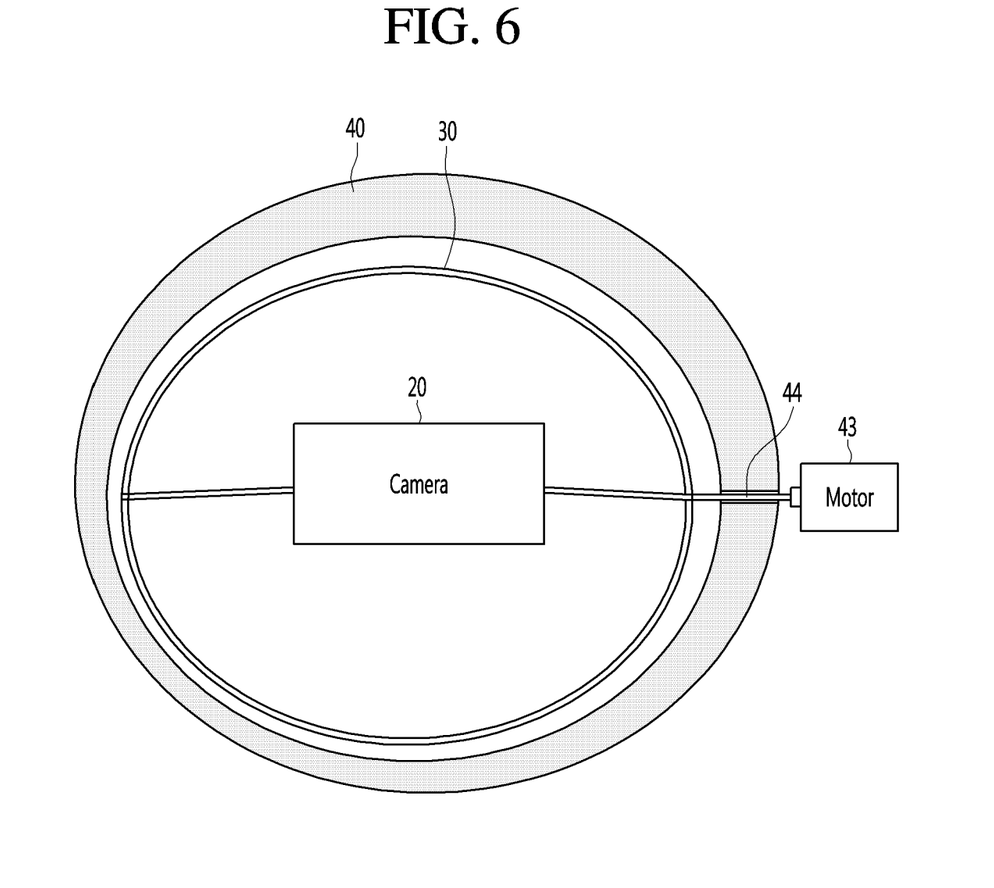
FIG. 6 is a bottom view illustrating a camera and a rotation cover that are integrally connected and rotated by one motor according to an embodiment.

FIG. 6 is a bottom view illustrating the camera 20 and the rotation cover 30 that are integrally connected and rotated by one motor 43 in accordance with an embodiment.

Referring to FIG. 6, the camera 20 may be fixed to the housing 40 along the rotary shaft 44, and the rotary shaft 44 of the rotation cover 30 may be connected to the motor 43. The motor 43 may rotate the rotation cover 30 according to the sensing signal.

In this case, since the camera 20 is connected to the rotary shaft 44, when the camera 20 is rotated, it may be difficult to monitor the cooking state, so that the operation of the camera 20 may be stopped according to the sensing signal.

Although not shown in the drawings, the rotation cover 30 is capable of rotating 360 degrees by the motor 43. In this case, to omit the process of stopping the cooking, it is possible to design to mount the motor 43 itself on only the glass cover such that only the rotation cover 30 is rotated 360 degrees while maintaining the angle of the camera 20.

Figure 7:
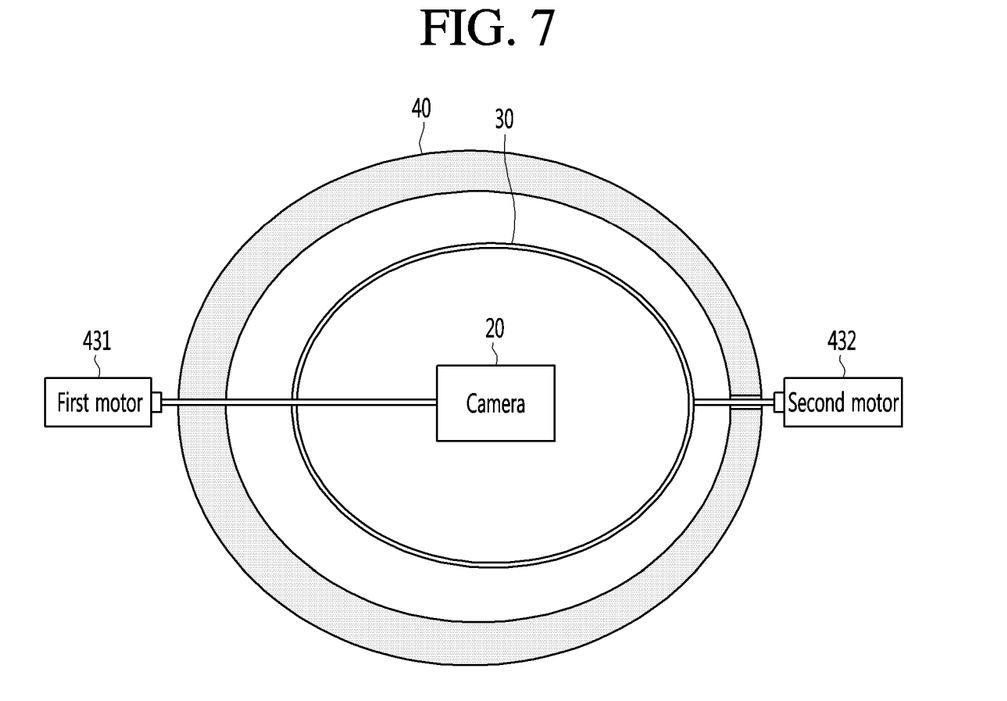
FIG. 7 is a bottom view illustrating a camera and a rotation cover that are individually rotated by first and second motors according to an embodiment.

FIG. 7 is a bottom view illustrating the camera 20 and the rotation cover 30 that are individually rotated by the first and second motors 431 and 432 according to an embodiment.

Referring to FIG. 7, since the first and second motors 431 and 432 are individually rotated, the camera 20 may control the cooking state to be continuously monitored. Even when the shaft is rotated by the second motor 432, the camera 20 may be designed to monitor the cooking state at all times since the rotation may be adjusted by the first motor 431.

In this case, the camera 20 and the rotation cover 30 may be rotated by −180 degrees to +180 degrees about the rotary shaft 44 by the motor 43. When the rotation direction is rotated 360 degrees, foreign materials gathers in one direction, or suction may not be smoothed by the suction tube 42. Thus, it is possible to perform the cleaning by rotating the rotation cover 30 in both side directions, that is, clockwise or counterclockwise.

Figure 8:
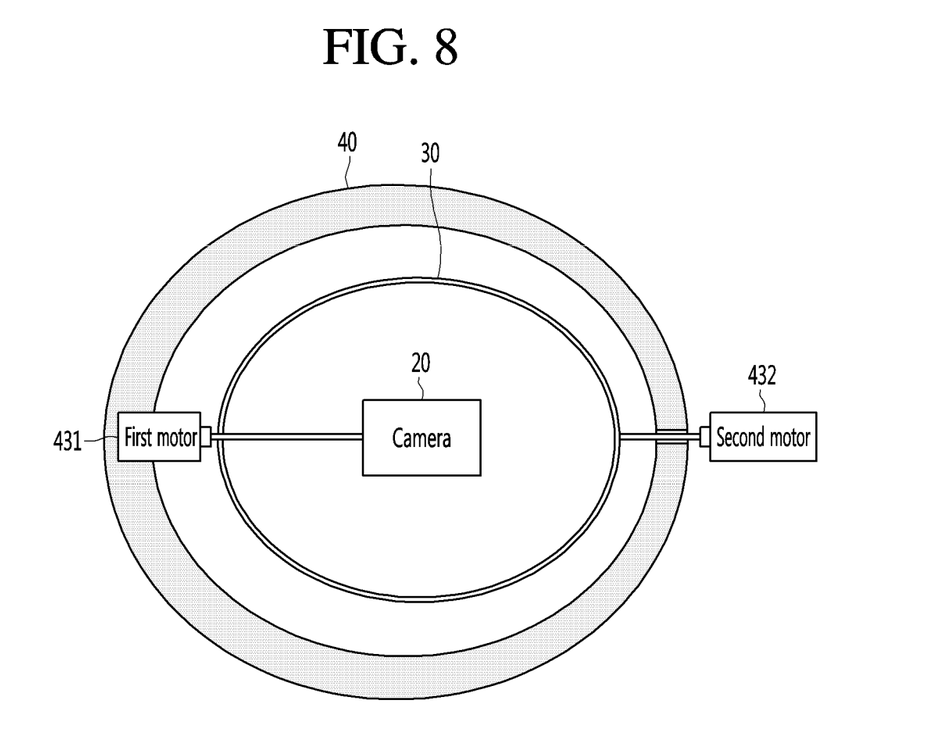
FIG. 8 is a bottom view illustrating the first motor of FIG. 7 installed inside the housing.

FIG. 8 is a bottom view illustrating the first motor 431 of FIG. 7 installed inside the housing 40.

Referring to FIG. 8, as the first motor 431 of FIG. 7 is mounted inside, there is an advance that reduces the volume of the housing 40 itself or is capable of easily performing designing according to the deformation of the outer housing 40. Although not illustrated for the second motor 432, the second motor 432 may also be mounted in the housing 40, and in this case, the structure of the housing 40 may be modified as necessary.

Hereinafter, a control method of removing a foreign material through the robot 100a having a function of cleaning the camera 20 described above will be described.

Figure 9:
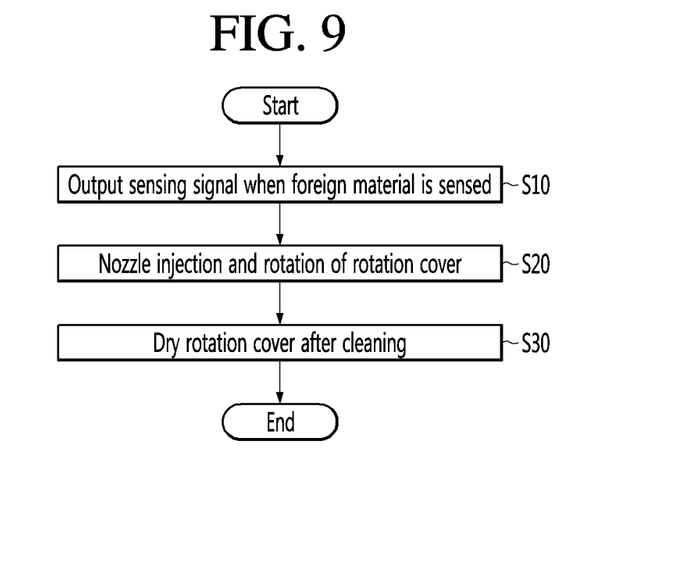
FIG. 9 is a flowchart illustrating a method of controlling a robot having a function of cleaning a camera according to an embodiment.

FIG. 9 is a flowchart illustrating a method of controlling the robot 100a having a function of cleaning the camera 20 according to an embodiment.

Referring to FIG. 9, a method of controlling the robot 100a having a function of cleaning the camera 20 may include a first step S10 of outputting a sensing signal when a foreign material is sensed, a second step S20 of allowing the nozzle 45 to inject and rotating the rotation cover 30, and a third step S30 of drying the rotary cover 30 after cleaning.

The first step S10 of outputting the sensing signal when a foreign material is sensed is an operation of sensing a foreign material on the rotation cover 30 formed of a transparent material to protect the camera 20 at a position spaced from the camera 20 in all directions.

In the first step, when a foreign material is detected in the camera 20 equipped with a foreign material detection sensor, a sensing signal may be output to the controller to drive at least one of the rotation cover 30, the cleaning module, or the driving module.

In this case, before the rotation cover 30 is rotated after the sensing signal is output, the robot 100a may be programed to stop the operations of the robot 100a except for the cleaning, or to drive the first and second motors 431 and 432 to be continuously operated.

According to an embodiment, the foreign material detection sensor may emit a sensing signal, and may receive a sensing signal reflected on a foreign material such as water vapor, oil vapor, adsorption material, dust attached to the rotation cover 30. A reflective photo-interrupter sensor that detect the type or amount of the foreign material attached to the rotation cover 30 according to a voltage change of the received sensing signal may be used, and the voltage value of the received sensing signal may be transmitted to the controller.

There is no voltage change in the sensing signal of the reflective photo-interceptor sensor according to an embodiment when there is no foreign material attached to the rotary cover 30. When a foreign material is attached, the voltage of the sensing signal changes low according to the amount of foreign matter. When a non-transparent foreign material is attached, the voltage of the sensing signal changes high.

The foreign material detection sensor may amplify the voltage of the received sensing signal and transmit it to the controller to analyze the type or amount of the foreign material attached to the rotation cover 30.

The second step S20 of allowing the nozzle 45 to inject and rotating the rotation cover 30 is an operation in which the cleaning module injects at least one of air, water or cleaning liquid through the nozzle 45 provided in the housing 40 according to the sensing signal, and at the same time, the rotation cover 30 is rotated by the driving module provided in the housing 40.

The third step S30 of drying the rotation cover 30 after cleaning is an operation of drying the rotation cover 30 after cleaning the rotation cover 30. In this case, the method may further include an operation of determining the completion of the cleaning, which may be determined by the foreign material detection sensor described above.

A drying module may be provided inside or outside the housing 40 to clean the rotation cover 30. The drying module may operate for a preset time at the same time as the cleaning is completed, thereby drying the rotation cover 30.

Figure 10:
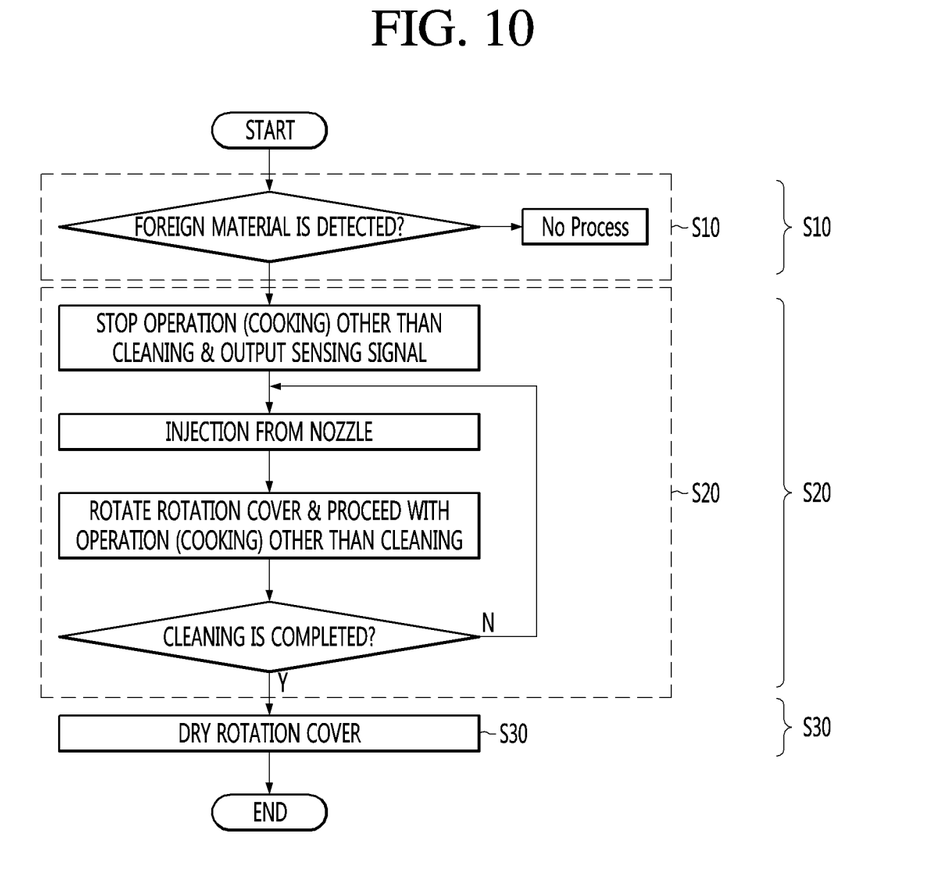
FIG. 10 is a detailed flowchart illustrating the control method of FIG. 9 according to an embodiment.

FIG. 10 is a detailed flowchart illustrating the control method of FIG. 9 according to an embodiment.

Referring to FIG. 10, after the sensing signal is output due to the detection of foreign materials, in the second step S20, an operation other than cleaning, that is, a cooking state may be stopped. Then, the method may further include a step of providing at least one air, water or cleaning liquid to the nozzle 45 provided in the housing 40 to inject it to the inside of the rotation cover 30, and a step of absorbing the foreign material through the suction tube 42 provided in the cleaning module.

The nozzle 45 connected to the cleaning tube 41 may fully receive at least one of air, water or cleaning liquid and store it, and operate according to the sensing signal of the controller to inject it to the glass surface of the rotation cover 30 placed inside the housing 40, thereby removing the foreign material.

The elastic member 46 serves to prevent the cleaned foreign material to leak out of the rotation cover 30, and may be designed to be formed of a material that can clean the rotation cover 30 during rotation.

When the camera 20 is fixed to the housing 40, it is possible to rotate only the rotary cover 30 or the camera 20 and the rotation cover 30 at the same time.

When only the rotation cover 30 is rotated, since the camera 20 can monitor the cooling state of food, there is no need to stop the cooling. However, according to an embodiment, although the rotation cover 30 is rotatable 360 degrees when the camera 20 and the rotation cover 30 are simultaneously rotated, the camera cannot monitor the cooking state of food. Thus, the method may include a step of stopping cooking.

In addition, when the camera 20 is fixed to the rotation cover 30, the camera 20 and the rotation cover 30 are rotatable by −180 degrees to +180 degrees around the rotary shaft 44 by the motor 4. As described above, in a situation in which the foreign material gathers in one direction or suction may not be smoothed by the suction pipe 42, the rotation cover 30 is rotated in both clockwise or counterclockwise directions for cleaning.

Figure 11:
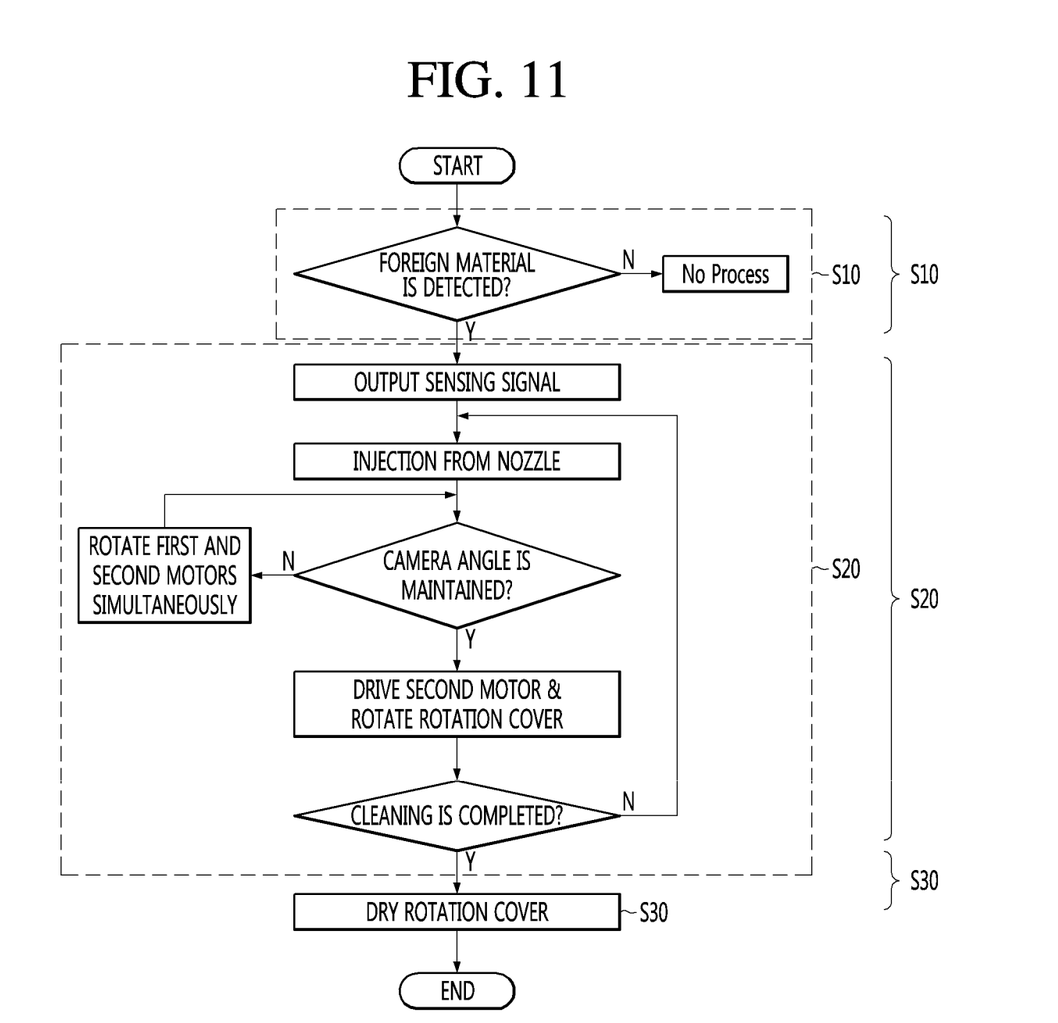
FIG. 11 is a detailed flowchart illustrating the control method of FIG. 9 according to another embodiment.

FIG. 11 is a detailed flowchart illustrating the control method of FIG. 9 according to another embodiment.

Referring to FIG. 11, the method may include connecting the camera 20 to the first motor 431 to maintain the angle of the camera 20.

After the sensing signal is output, the method may include receiving, by the controller, the sensing signal transmitted from the camera 20 to drive at least one of the rotation cover 30, the driving module or the cleaning module.

In this process, the camera 20 located inside the rotation cover 30 is fixed to the housing 40 located outside the rotation cover 30, and the method may include a step of rotating the rotation cover 30 by the motor 43 provided in the driving module.

The first and second motors 431 and 432 may be respectively connected to the camera 20 and the rotation cover 30 to be individually rotated, and may maintain the angle of the camera 20 through control of the first motor 431 even when the camera 20 and the rotation cover 30 move at the same time.

According to an embodiment, the first and second motors 431 and 432 may be rotated at the same time, or the only the second motor 432 may be drive to rotate the rotation cover 30.

In addition, according to each embodiment, the rotation cover 30 may be cleaned in the same manner as in the above-described first to fourth embodiments for the robot 100a having the function of cleaning the camera 20.

According to the embodiments, since the foreign material detection sensor and the rotation cover 30 are configured to automatically sense and clean the foreign material, the cleaning time due to manual work may be reduced. In addition, the first and second motors 431 and 432 are provided in the driving module to separately operate the camera 20 and the rotation cover 30, so that the cooking may proceed during cleaning.

In addition, according to the embodiments, the suction tube 42 is provided separately from the cleaning tube 41 to automatically suck the foreign matter even after cleaning the rotary cover 30, so that it is possible to smoothly secure the field of view of the camera 20.

According to the embodiments, the foreign material detection sensor and the rotary cover may be configured to automatically detect and clean the foreign material, thereby reducing the time required for cleaning by hand.

According to the embodiments, the first and second motors for separately operating the camera and the rotation cover are provided in the drive module, respectively, so that cooking may be performed even during cleaning.

According to the embodiments, the suction tube is provided separately from the cleaning tube, so that the foreign material is automatically sucked even after the rotation cover is cleaned, so that the field of view of the camera may be smoothly secured.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot having a cleaning function for securing a camera field of view, the robot comprising:
    a camera having a foreign material detection sensor and configured to output a detection signal upon detecting a foreign material and take an image in all directions;
    a rotation cover formed of a transparent material to protect the camera from the foreign material and at a position spaced apart from the camera in all directions, and configured to rotate according to the detection signal; and
    a housing fixed to a photographing position of the robot, configured to fix a driving module of the rotation cover, and connected to a cleaning module configured to clean the rotation cover,
    wherein the cleaning module includes:
        a cleaning tube configured to supply at least one of air, water, or a cleaning liquid into the housing; and
        a suction tube configured to remove the foreign material during or after cleaning the rotation cover.

2. The robot according to claim 1, wherein the driving module includes a motor positioned between the rotation cover and the housing or at an outside of the housing to rotate the camera or to simultaneously rotate the camera and the rotation cover.

3. The robot according to claim 2, wherein the camera is fixed to the housing,
    wherein a rotary shaft of the rotation cover is connected to the motor, and
    wherein the motor rotates the rotation cover according to the detection signal.

4. The robot according to claim 3, wherein the rotation cover is rotated by 360 degrees by the motor.

5. The robot according to claim 2, wherein the camera is fixed to the rotation cover,
    wherein a rotary shaft of the rotation cover is connected to the motor, and
    wherein the motor rotates the rotation cover according to the detection signal to simultaneously rotate the camera and the rotation cover.

6. The robot according to claim 5, wherein the camera and the rotation cover are rotated by −180 degrees to +180 degrees about the rotary shaft by the motor.

7. The robot according to claim 1, wherein the housing includes:
    a nozzle configured to inject the at least one of the air, the water, or the cleaning liquid into an inside of the housing according to the detection signal; and
    an elastic member configured to form a space between the rotation cover and the housing to position the nozzle, and formed at two ends of the rotation cover to prevent leakage of a spraying material of the nozzle and in close contact with the rotation cover.

8. The robot according to claim 1, wherein the cleaning module and the suction tube are driven when a sum of pixel values of an image collected by the camera is less than a preset threshold, and
    wherein an operation of the rotation cover is stopped when the suction tube is driven.

9. The robot according to claim 1, further comprising a controller configured to drive at least one of the rotation cover, the driving module, or the cleaning module according to the detection signal transmitted from the camera.

10. A method of controlling a robot having a cleaning function for securing a camera field of view, the method comprising:
    outputting a detection signal when a foreign material is detected on a rotation cover, wherein the rotation cover is formed of a transparent material to protect a camera and at a position spaced apart from the camera in all directions; and
    rotating the rotation cover by a driving module provided in a housing while injecting at least one of air, water, or a cleaning liquid to the rotation cover through a nozzle provided in the housing in a cleaning module according to the detection signal,
    wherein the rotating of the rotation cover includes:
        supplying the at least one of the air, the water, or the cleaning liquid from a cleaning tube of the cleaning module to the nozzle provided in the housing to inject the at least one of the air, the water, or the cleaning liquid to an inside of the rotation cover; and
        sucking the foreign material through a suction tube provided in the cleaning module.

11. The method according to claim 10, further comprising drying the rotation cover after cleaning the rotation cover.

12. The method according to claim 10, wherein the outputting of the detection signal includes stopping an operation of the robot other than cleaning before the rotation cover is rotated after the detection signal is output.

13. The method according to claim 10,
wherein the suction tube is driven when a sum of pixel values of an image collected by the camera is less than a preset threshold.

14. The method of claim 10, wherein the rotating of the rotation cover further includes stopping an operation of the rotation cover when the suction tube is driven.

15. The method according to claim 10, wherein the rotating of the rotation cover further includes rotating the rotation cover by a motor provided in the driving module, in which the camera positioned inside the rotation cover is fixed to the housing positioned outside the rotation cover.

16. The method according to claim 15, wherein the rotation cover is rotated by 360 degrees by the motor.

17. The method according to claim 10, wherein the rotating of the rotation cover further includes rotating the camera and the rotation cover by rotating a rotary shaft of the rotation cover by a motor provided in the driving module, in which the camera and the rotary shaft are fixed to the housing.

18. The method of claim 10, wherein the cleaning module is driven when a sum of pixel values of an image collected by the camera is less than a preset threshold.

19. The method according to claim 10, further comprising driving at least one of the rotation cover, the driving module, or the cleaning module by receiving the detection signal transmitted from the camera at a controller.

20. A robot having a cleaning function for securing a camera field of view, the robot comprising:
- a camera having a foreign material detection sensor and configured to output a detection signal upon detecting a foreign material and take an image in all directions;
- a rotation cover formed of a transparent material to protect the camera from the foreign material and at a position spaced apart from the camera in all directions, and configured to rotate according to the detection signal; and
- a housing fixed to a photographing position of the robot, configured to fix a driving module of the rotation cover, and connected to a cleaning module which is configured to clean the rotation cover, wherein the housing includes:
- a nozzle configured to inject at least one of air, water, or a cleaning liquid into an inside of the housing according to the detection signal; and
- an elastic member configured to form a space between the rotation cover and the housing to position the nozzle, and formed at two ends of the rotation cover to prevent leakage of a spraying material of the nozzle and in close contact with the rotation cover.

* * * * *